Figure 1:
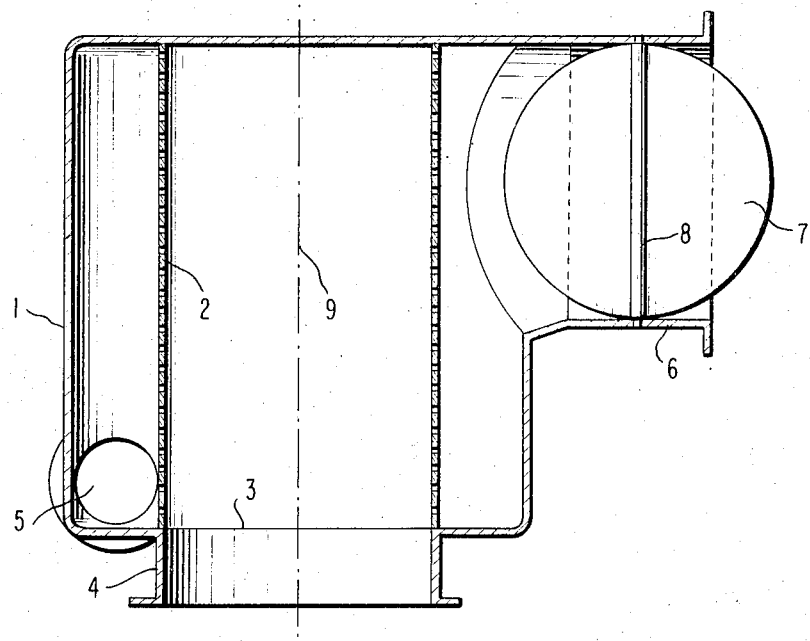

United States Patent [19]

Treplin et al.

[11] 3,789,992
[45] Feb. 5, 1974

[54] SCREEN INSTALLATION FOR SEPARATING SOLIDS FROM LIQUID STREAMS IN PIPELINES

[75] Inventors: Friedrich-Wilhelm Treplin, Hoesel; Guido Veltmann, Wittlaer; Heinz Thal, Lintorf, all of Germany

[73] Assignee: Ludwig Taprogge, Dusseldorf, Germany

[22] Filed: Nov. 8, 1971

[21] Appl. No.: 196,474

[52] U.S. Cl............. 210/405, 210/421, 210/435, 210/456
[51] Int. Cl...................... B01d 29/42, B01d 35/22
[58] Field of Search...... 55/205; 210/304, 316, 405, 210/421, 422, 456, 457, 435

[56] References Cited
UNITED STATES PATENTS
2,099,502  11/1937  Stockdale .................. 210/422 X
1,204,756  11/1916  Goldblatt .................... 210/422
3,063,566  11/1962  Hanley ....................... 210/422 X
3,174,622  3/1965   LaMort ....................... 210/304 X
624,580    5/1899   Tousey ....................... 210/422 X FOREIGN PATENTS OR APPLICATIONS
233,464  2/1960  Australia ................... 210/304

Primary Examiner—Samih N. Zaharna
Assistant Examiner—Richard W. Burks
Attorney, Agent, or Firm—Craig and Antonelli

[57] ABSTRACT

A screen installation for the separation of solids from liquid streams in pipelines, which comprises a separator housing with built-in screen basket against which the liquid stream flows from the outside and which is connected with the housing wall at its open end; in addition to at least one discharge opening for the soiled water arranged near the screen base, the housing is provided with a lateral inlet pipe for the soiled water which includes an adjustable guide means for the tangential deflection of the liquid stream flowing transversely against the screen basket.

13 Claims, 3 Drawing Figures

SCREEN INSTALLATION FOR SEPARATING SOLIDS FROM LIQUID STREAMS IN PIPELINES

The present invention relates to a screen installation for the separation of solid materials from liquid streams in pipelines, consisting of a separating housing with built-in screen basket against which the liquid flows from the outside, which is connected with its open end to the housing wall and which is provided further with a discharge aperture arranged near the screen base for the contaminated water stream.

A separator for solid materials from liquid streams in a pipeline with a conically shaped screen basket is described in German Pat. No. 1,298,506 according to which the conically shaped screen basket is installed with its apex opposite the direction of flow of the liquid into a substantially rectilinearly extending pipeline. With this known construction, the solid materials should and must slide practically along the inclined plane of the screen surface into a toroidal channel surrounding the screen cone base. In this channel an additional annular flow is produced by way of a connecting pipe directed tangentially to the toroidal axis, which seizes the floating solid materials drained into the channel and discharges the same by way of a further tangentially directed connecting pipe.

Experiences with known installations, however, teach that in power plants with mussel growth in the cooling water system, also other types of contaminations and impurities may occur in the cooling water which possess, for example, a fibrous structure such as algae, weeds or a predominately flat-shaped structure such as leaves or—in recent times ever more frequently—residues of used packaging foils. In the known constructions these contaminations do not slide along the screen surface into the toroidal channel but deposit themselves beginning at the screen base and from there to an ever-increasing extent over the entire screen surface and covering thereby the screen surface. Even though it is attempted with the separator of this type of construction to impart, by means of stationary guide blades at the cone apex, a swirl to the mainstream which flows into the separator substantially parallelly to the screen basket, such swirl is able to force solid materials of higher density into the area near the wall of the pipeline only in proximity of the screen apex. For with solids of the aforementioned fibrous or flat shaped structure, whose density differs barely from that of the cooling water, the guide blades remain ineffectual. The stationary guide blades or baffles additionally entail the disadvantage that they increase unnecessarily the pressure loss of the separator in case of a clean screen surface; with a strongly covered screen surface, however, they are only slightly effective by reason of the liquid stream generally decreasing as a result thereof. Rather with the known construction a cleaning of the screen surface covered with such materials is possible practically and if necessary only if a gate-type shut-off valve is closed upstream of the separator and the water column remaining in the separator is also set into rotation by the annular flow in the toroidal channel whereby the materials adhering to the screen are flushed off and can be discharged after the opening of the shut-off valve. During this flushing operation, one has to operate with relatively large and therewith uneconomical flushing qualities, especially when the shut-off valve cannot be closed completely by reason of the need for the maintenance of the mainstream.

The present invention is concerned with the task to provide a screen installation, with the aid of which solid bodies can be separated irrespective of their structure and density with a continuously maintained liquid stream and with minimum pressure losses and under realization of a particularly simple construction.

The underlying problems are solved according to the present invention with a screen installation of the aforementioned type in that the housing is provided within the area of the screen basket with a lateral inlet connecting pipe for the solid or contaminated water, and in that at least one adjustable guide means for the tangential deflection of the soiled water stream flowing transversely against the screen basket is arranged in this inlet pipe connection. The term "tangential deflection" of the soiled water stream is thereby to be understood as the deflection thereof tangentially to the screen surface during the entry into the annular space between the screen basket and the housing. These measures of the present invention utilize the experience that solid materials also of the aforementioned fibrous or flat shaped structure, are not deposited on a screen surface traversed by the liquid, or always redetach themselves immediately when the magnitudes corresponding to the velocity, direction and turbulence exist characterizing the flow.

One is now able to achieve by the measures of the present invention to so deflect the liquid stream entering the annular space between the housing wall and the screen basket by an appropriate adjustment of the guide means that the liquid flows toward the screen surface more or less tangentially; a velocity increase connected with a strong turbulence thereby results in the annular space. The soiling in the form of the described solids does not lead to a deposit but migrates in the direction of the main component of the flow, namely in the direction toward the screen base where it can be readily removed and discharged thereat out of the separator housing by the discharge aperture provided thereat for the contaminated water.

According to a preferred embodiment of the present invention which attains independent significance, provision is made that the adjustable guide mechanism consists of a flap or valve rotatably supported in the inlet pipe connection, whose guide surface corresponds approximately to the flow cross section of the pipe connection. The possibility exists thereby to select any desired intermediate position between the end positions of this valve and therewith to match the flow condition in the annular space to the requirements of the contaminant yield. During periods with only slight dirt or contaminant yield, it may be appropriate to leave the valve in the completely open position in order to exclude avoidable pressure losses; finally an intermittent operation is also possible by conventional means. As to the rest it may be advantageous if the axis of rotation of the valve does not extend parallel to the center axis of the housing but forms with the same an angle in order to impart an additional turbulence-increasing component to the liquid stream.

The advantages achieved by the present invention reside essentially in that a screen installation for the separation of solids out of liquid streams in pipelines is realized, with the aid of which, in addition to solid bodies of higher strength and density which slide off from the screen surface of the screen basket, also solids of predominantly fibrous or flat structure, which adapt themselves to the screen surface and tend to deposit thereon, can be continuously separated with a practically continuously maintained liquid flow and without subjecting the liquid stream to a high pressure loss. In particular, the application of the screen installation according to the present invention is not limited to any particular given types of solids but is possible with all solid materials as may practically occur in the cooling water operation. The screen installation according to the present invention thereby distinguishes itself by a particularly simple and operationally reliable construction and operates in its result with improved efficiency.

Figure 2:
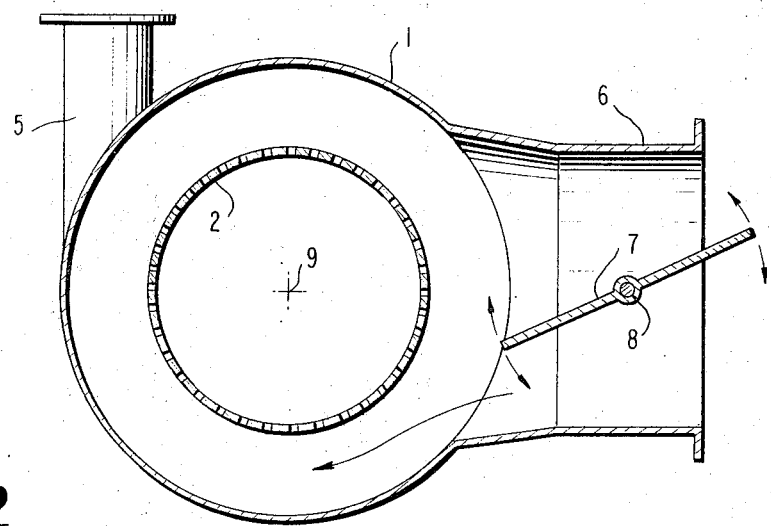
Figure 3:
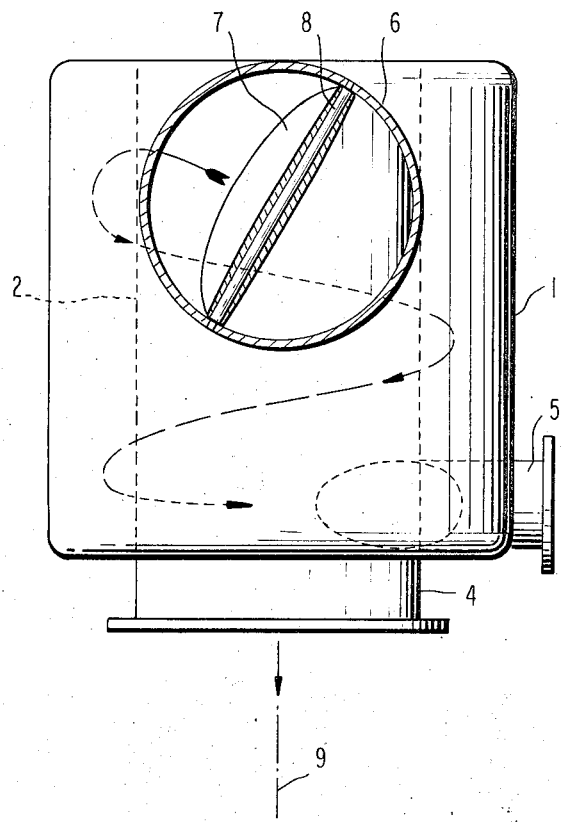

These and further objects, features and advantages of the present invention will become more apparent from the following description when taken in connection with the accompanying drawing which shows, for purposes of illustration only, one embodiment in accordance with the present invention, and wherein:

FIG. 1 is a vertical, cross-sectional view through a screen installation according to the present invention, FIG. 2 is a horizontal, cross-sectional view through the screen installation of FIG. 1, and FIG. 3 is an elevational view of a modified embodiment of a screen installation in accordance with the present invention.

Referring now to the drawing wherein like reference numerals are used throughout the various views to designate like parts, a screen installation for the separation of solids from liquid streams in pipelines is illustrated in FIGS. 1 and 2, which consist in its basic construction of a separator housing 1 with built-in screen basket 2 which is connected with its open end 3 with the housing wall 4 forming an opening for discharging the liquid stream passing through the screen basket 2; the separator additionally includes at least one contaminant discharge opening 5 arranged near the screen base. As indicated in the Figures, the screen basket 2 is cylindrical and arranged concentrically within a cylindrical portion of the housing 1. The housing 1 is provided within the area of the screen basket 2 with a lateral inlet pipe connection 6 for the contaminated or oiled water. At least one adjustable guide means 7 for the tangential in-flow of the liquid against the screen basket 2 or the tangential deflection of the contaminated water stream flowing transversely against the screen basket 2 is arranged in this inlet pipe 6. The contaminated or soiled water stream is indicated by an arrow. The adjustable guide means consist of a valve 7 rotatably supported in the inlet pipe connection 6, whose guide surface corresponds approximately to the flow cross-section of the pipe connection. This valve 7 thereby enables an adjustment between a complete opening and a complete closing of the flow cross-section in the inlet pipe connection 6, i.e., an adjustment between 0 and 90°, depending on the required turbulence.

It may also be advantageous if the axis of rotation of the pivot shaft 8 of the valve 7 does not extend parallel to the center axis 9 of the housing 1 as illustrated in FIG. 1 but if differing therefrom, it forms therewith an angle in order to impart an additional turbulence-reinforcing component to the flow, as shown in FIG. 3.

While I have shown and described only one embodiment in accordance with the present invention, it is understood that the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

What we claim is:

1. A screen installation for separating solids from liquid streams in pipelines, which includes a separator housing means with a screen basket means having its open end connected with walls of the housing means, in which the liquid flows externally against the screen means, and which is provided with at least one discharge aperture means arranged near the screen base, characterized in that the housing means includes a lateral inlet pipe connection within the area of the screen means for soiled water, and at least one adjustable guide means in said inlet pipe connection for the substantially tangential deflection of the soiled water stream flowing transversely against the screen means.

2. A screen installation according to claim 1, characterized in that the adjustable guide means consists of a valve rotatably supported in the inlet connection whose guide surface corresponds approximately to the flow cross section of the inlet pipe connection.

3. A screen installation according to claim 2, characterized in that the axis of the valve means forms an angle with the center axis of the housing means.

4. A screen installation according to claim 1, characterized in that the axis of the valve means forms an angle with the center axis of the housing means.

5. A screen installation for separating solids from liquid streams in pipelines comprising a separator housing means, a screen basket means arranged in said separator housing means to define an annular space between said screen basket means and said housing means for separating solids from a liquid stream directed against the exterior of said screen basket means, said screen basket means having an open end at a screen base connected with an opening of said housing means, at least one discharge aperture means arranged near said screen base in said housing means for discharging from said housing means said solids separated from said liquid stream, inlet pipe means connected laterally to said housing means for flowing said liquid stream carrying solids into said housing means transversely to said screen basket means, and at least one adjustable valve means disposed in said inlet pipe means for deflecting said liquid stream carrying solids into a substantially tangential flow toward said screen basket means and for providing turbulence of said liquid stream in said annular space, whereby said turbulence can be varied depending on the type and nature of said solids to promote continuous removal of solids from the exterior of said screen basket means.

6. A screen installation according to claim 5, wherein said adjustable valve means is formed of a disk-shaped element having a surface corresponding approximately to the flow cross section of said inlet pipe means.

7. A screen installation according to claim 6, wherein said adjustable valve means is rotatable about an axis, said axis forming an angle with the center axis of the housing means.

8. A screen installation according to claim 7, wherein said axis of said adjustable valve means is parallel to said center axis.

9. A screen installation according to claim 5, wherein said adjustable valve means is rotatable about an axis, said axis forming an angle with a center axis of said housing means and said concentrically arranged screen basket means.

10. A screen installation according to claim 9, wherein said axis of said adjustable valve means is parallel to said center axis.

11. An installation according to claim 5, wherein said discharge aperture means are arranged tangentially with respect to said housing means.

12. An installation according to claim 5, wherein said screen basket means is cylindrical and is disposed concentrically in a cylindrical portion of said housing means.

13. An installation according to claim 5, wherein said opening of said housing means is relatively larger than said discharge aperture means.

* * * * *

UNITED STATES PATENT OFFICE
CERTIFICATE OF CORRECTION

Patent No. 3,789,992  Dated February 5, 1974

Inventor(s) Friedrich-Wilhelm Treplin, Guido Veltmann, Heinz Thal

It is certified that error appears in the above-identified patent and that said Letters Patent are hereby corrected as shown below:

Title page, insert the following:

[30]   Foreign Application Priority Data

November 27, 1970  Germany ... P 20 58 395.3

Signed and sealed this 10th day of September 1974.

(SEAL)
Attest:

McCOY M. GIBSON, JR.
Attesting Officer

C. MARSHALL DANN
Commissioner of Patents